May 11, 1937.  H. D. GEYER  2,079,798
RESILIENT MOUNTING UNIT
Filed Oct. 26, 1933

INVENTOR
Harvey D. Geyer
BY
Spencer Hardman & Fehr
HIS ATTORNEYS

Patented May 11, 1937

2,079,798

UNITED STATES PATENT OFFICE 2,079,798

RESILIENT MOUNTING UNIT

Harvey D. Geyer, Dayton, Ohio, assignor, by mesne assignments, to General Motors Corporation, Detroit, Mich., a corporation of Delaware Application October 26, 1933, Serial No. 695,274

5 Claims. (Cl. 248—358)

This invention relates to yieldable mounting units having non-metallic resilient material such as rubber interposed between metal parts so as to break metallic connection between the connected members, such as an automobile engine and its support.

Applicant's prior Patent No. 1,828,402, October 20, 1931, discloses a somewhat similar form of yieldable mounting unit. The present invention provides an improved mounting unit wherein the rubber is vulcanized in situ in contact with the metal cup and inserted metal head and thereby strongly surface-bonded to these parts whereby a positive non-slipping relation between the rubber and metal is provided. By so vulcanizing the rubber in situ it is not necessary to highly compress the rubber to maintain a desired non-slipping relation and hence a more yieldable mounting unit may be provided by this invention than by that of the above prior patent.

Another feature of this invention is the air pockets in the resilient rubber block which may be conveniently and accurately molded therein during the vulcanization in situ of the rubber block and thereby provide greater yieldability of the mounting unit. These air pockets provide a space for the rubber to flow and partially fill in during relative movement between the connected members, which obviously provides a greater freedom of movement between the connected members.

A more specific object of this invention is to provide a mounting unit wherein such air pockets are so located in the rubber block on opposed lateral sides of the inserted metal head as to provide greater lateral yieldability in the line of direction of said air pockets than in the transverse lateral direction. Thus the mounting unit may be made to have a desired degree of lateral yieldability in one direction, a greater yieldability in a transverse lateral direction, and still a third degree of yieldability in its axial direction, dependent in each case upon the loads to be sustained and movement desired in each direction.

Further objects and advantages of the present invention will be apparent from the following description, reference being had to the accompanying drawing, wherein a preferred embodiment of one form of the present invention is clearly shown.

In the drawing:

Fig. 3 is a section through the mounting unit taken on line 3—3 of Fig. 4, and shows the unit as it comes from the vulcanizing mold.

Fig. 4 is a plan view of Fig. 3.

Similar reference characters refer to similar parts throughout the several views.

Figure 1:
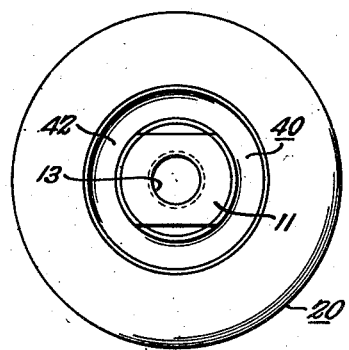
Fig. 1 is a plan view of the mounting unit of this invention shown separate from the connected members.
Figure 2:
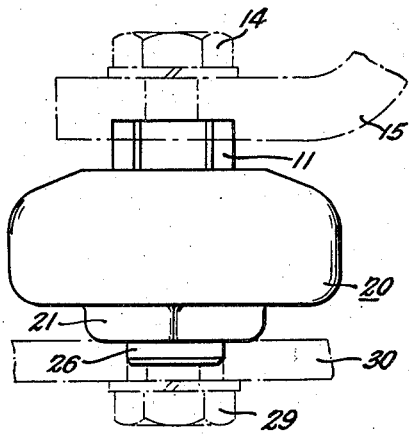
Fig. 2 is a side elevation thereof showing it attached to the members connected thereby.

10 designates the circular inner metal head, preferably of malleable iron or a steel forging, having a flat bottom 12 of substantial area and an upwardly projecting shank portion 11 having a threaded hole 13 therein adapted to receive a bolt 14 for rigidly attaching the head 10 to its connected member 15 (see Fig. 2).

Figure 3:
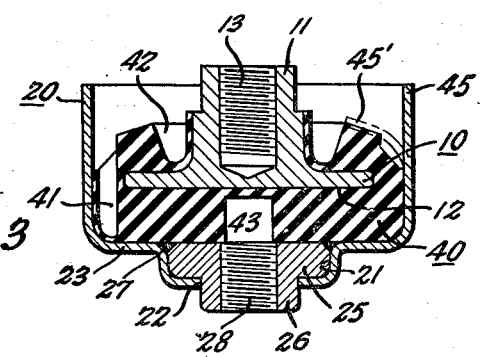

The outer metal cup 20 is first drawn to the shape shown in Fig. 3, having a hexagon shaped recess 21 and a hole 22 in its bottom wall 23. The special nut 25 fits snugly within recess 21 and its shank portion 26 projects through hole 22 in the cup. Preferably nut 25 is held fixed in place by several spaced arc welds as shown at 27. Nut 25 has a threaded hole 28 extending therethrough, adapted to receive a bolt 29 for rigidly attaching the cup 20 to its connected member 30 (see Fig. 2).

A resilient rubber block 40 is molded and vulcanized in situ to the head 10 and cup 20 in the shape shown in Fig. 3. The metal surfaces which contact with the rubber are preferably first brass plated to provide a strong vulcanized bond between the rubber and metal and these parts are properly located within the vulcanizing mold as inserts and the rubber block 40 vulcanized and simultaneously bonded thereto. The lip of cup 20 remains full open as shown in full lines in Fig. 3 during vulcanization in order to permit the upper molding die to axially enter the cup 20 and mold the rubber block 40 to the desired shape. The upper molding die is preferably provided with suitable projections which mold the series of air pockets 41 and the annular groove 42 in block 40. The lower central air pocket 43 is preferably molded in the block 40 by means of a suitably shaped core which is threaded through the hole 28 and thus held properly located. It is thus seen that even though the rubber block 40 is vulcanized in situ to the cup 20 and head 10 these metal parts do not prevent the desired molding of the air pockets 42 and 41 in block 40. This is an important feature of this invention.

Figure 5:
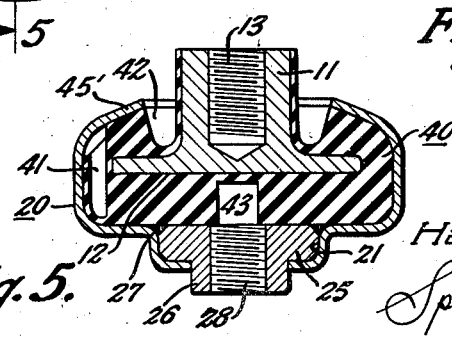
Fig. 5 is a section similar to Fig. 3 but shows the completed unit.

After the unit shown in full lines in Fig. 3 is taken from the mold the upper periphery or lip 45 of cup 20 is turned inwardly by a suitable swaging die to the position 45' shown in dotted lines on the right side of Fig. 3 and in full lines in Fig. 5. This puts the rubber block 40 under the desired initial compression and the lip 45' closes the top and seals the air in the air pockets 41. Fig. 5 shows the completed mounting unit, which is then rigidly attached to the connected members 15 and 30 by means of the two bolts 14 and 29 as shown in Fig. 2. Member 15 may be the rear support arm of an automobile engine and member 30 the part of the chassis frame which supports the engine.

Figure 4:
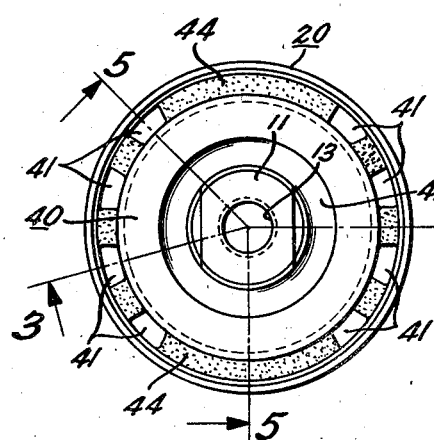
Figs. 3 and 4 show a partially completed unit.

In operation, the resilient block 40 yields in all directions by an internal distortion of the rubber and thus provides a cushioned metal-isolating support for the engine or other supported device. The air pockets 41 being located on opposed lateral sides of the head 10, as shown in Fig. 4, will obviously provide a materially greater yieldability in the direction laterally across Fig. 4 than vertically across Fig. 4 since the air in pockets 41 is relatively easily compressed and provides a space in which the resilient rubber can flow by internal distortion. The laterally opposed solid rubber portions 44 more highly resist lateral movement of the head 10 in the direction vertically across Fig. 4. The annular groove 42 obviously increases the lateral yieldability of the mounting unit without materially increasing the vertical yieldability thereof. The central air pocket 43 increases the vertical yieldability of the unit without materially increasing the lateral yieldability thereof.

While the form of embodiment of the present invention as herein disclosed, constitutes a preferred form, it is to be understood that other forms might be adopted, all coming within the scope of the claims which follow.

What is claimed is as follows:

1. A yieldable mounting unit for connecting two members, comprising: a metal cup having means for fixing to one of said members, a metal head located within said cup in spaced relation thereto and having means for fixing to the other connected member, and a resilient rubber block interposed between and isolating said head and cup, said block having air pockets molded therein on two opposed lateral sides of said head in such manner as to provide greater lateral yieldability of the mounting unit in the line of direction of said air pockets than in the lateral direction substantially transverse thereto.

2. A yieldable mounting unit for connecting two members, comprising: a pressed metal cup having an opening at one end and having means at the opposed end for fixing said cup to one of said connected members, a metal head within said cup and having a portion exposed by said opening for fixing said head to the other connected member, and a resilient rubber block interposed between and isolating said head and cup and surface-bonded by vulcanization in situ to both said head and cup, said pressed metal cup having its walls deformed inwardly to partially close said opening after said metal head and rubber block have been molded into place therein, said deformed walls axially compressing said rubber block down upon the bottom wall of said cup.

3. A yieldable mounting unit for connecting two members, comprising: a metal cup having an opening at one end and having means at the opposed end for fixing said cup to one of said connected members, a metal head within said cup and having a portion exposed by said opening for fixing said head to the other connected member, and a resilient rubber block interposed between and isolating said head and cup and surface-bonded by vulcanization in situ to both said head and cup, said block having a series of axially extending air pockets located laterally of said head in such manner as to materially increase the lateral yieldability of the mounting unit in the direction of said pockets, said air pockets being closed after the rubber is vulcanized by an inturned lip on said cup.

4. A yieldable mounting unit for connecting two members, comprising: a metal cup having an opening at one end and having means at the opposed end for fixing said cup to one of said connected members, a metal head within said cup and having a portion exposed by said opening for fixing said head to the other connected member, and a resilient rubber block interposed between and isolating said head and cup, said block having air pockets molded therein on two opposed lateral sides of said head in such manner as to provide greater lateral yieldability of the unit in the line of direction of said air pockets than in the transverse lateral direction.

5. A yieldable mounting unit for connecting two members, comprising: a pressed metal cup having an opening at one end thereof and having means for fixing said cup to one of said members, a metal head located within said cup in spaced relation thereto and having means exposed by said opening for fixing said head to the other connected member, and a resilient rubber block isolating said head and cup and surface-bonded by vulcanization in situ to both said head and cup, said cup having an inturned lip bent down upon and axially compressing said rubber block between said lip and the bottom wall of said cup.

HARVEY D. GEYER.